United States Patent [19]

LeFevre

[11] 4,208,365
[45] Jun. 17, 1980

[54] METHOD AND APPARATUS FOR MOLDING TORIC CONTACT LENSES

[75] Inventor: Robert J. LeFevre, Bethlehem, Pa.

[73] Assignee: National Patent Development Corporation, New York, N.Y.

[21] Appl. No.: 971,241

[22] Filed: Dec. 20, 1978

[51] Int. Cl.² .............................................. B29D 11/00
[52] U.S. Cl. ...................................... 264/1; 249/155; 264/313; 425/808
[58] Field of Search .................. 264/1, 313, 219, 220; 425/808; 249/139, 154, 155, 159, 165; 351/160 R, 160 H, 161

[56] References Cited

U.S. PATENT DOCUMENTS

| 3,079,737 | 3/1963 | Kratt et al. ................. 351/177 R |
| 3,251,908 | 5/1966 | Wilenino et al. .................. 425/808 |
| 3,277,576 | 10/1966 | Kraft .................................. 249/154 |
| 3,283,446 | 11/1966 | Feinbloom ................. 351/160 R |
| 3,361,858 | 1/1968 | Wichterle ........................ 425/808 |
| 3,475,521 | 10/1969 | Stroop ................................. 264/1 |
| 3,555,611 | 1/1971 | Reiterman ........................ 425/808 |
| 3,623,800 | 11/1971 | Volk ............................... 351/177 R |
| 3,922,327 | 11/1975 | Howden ............................... 264/1 |
| 4,121,896 | 10/1978 | Shepherd ............................ 264/1 |

Primary Examiner—James B. Lowe
Attorney, Agent, or Firm—Cushman, Darby & Cushman

[57] ABSTRACT

A mold is described including at least one flexible mold member fabricated from thermoplastic polymeric materials. Desirably, the flexible mold member is placed within a circular torque ring and pressure is applied to flex the mold member into a selected toric configuration, a polymerizable mixture is inserted, the mold closed and the mixture is hardened into the desired lens. Lenses so produced, which may be either flexible or rigid, have at least one surface which is toric in configuration.

35 Claims, 5 Drawing Figures

METHOD AND APPARATUS FOR MOLDING TORIC CONTACT LENSES

BACKGROUND OF THE INVENTION

Corneal contact lenses are designed to have physical properties and shapes compatible with the physical and physiological characteristics of the user's eye and to have optical properties providing the necessary visual correction. While most basic types of contact lenses are constituted by spherical surfaces there exists a significant number of users who exhibit toric cornea, a characteristic physical configuration of the corneal curvature. Corneal toricity is recognized as the prime contributor to an astigmatic refractive error but, when the toricity is not too great, it may be present without producing an astigmatism. The astigmatic refractive error is one property of the light rays that have passed through the eye's various refractive interfaces to form an image upon the retina. Accordingly, lens types more complex than spherical surfaces, which are constituted by one or two toric surfaces are often required to achieve an optimum physical fit, an optimum correction of the refractive error, or both. It is recognized that such lenses are more costly, more difficult to manufacture accurately, and more difficult to fit effectively than are the spherical surface-types of lenses. See generally the discussion in Mandell, Contact Lens Practice, Second Edition, pp. 565-602, the disclosure of which is hereby incorporated by reference.

Toric corneal contact lenses were first introduced by Stimpson in 1950 and the toric base corneal contact lens and its use were described in 1952 and 1953 by Schapero and Baglien. Today the toric back surface corneal contact lens is used to obtain an optimum lens-cornea bearing relationship when the toricity of the cornea precludes the use of a spherical back surface lens. Thus the principal use is to fit a toric cornea and not to correct an astigmatic refractive error or residual astigmatism; see Mandell, above.

Prior art procedures for the manufacture of toric contact lenses are time-consuming and fairly expensive involving a considerable amount of hand finishing. Moreover, the apparatus used to fabricate such lenses was often elaborate and difficult to achieve reproducible results. Illustrative patents include U.S. Pat. Nos. 3,079,737; 3,344,692; 3,482,906; 3,535,825; 3,623,800 and 3,950,082.

Spherical contact lenses may be prepared by a casting method in order to reduce or eliminate costly machining and polishing of the lens as described in U.S. Pat. No. 4,121,896, issued Oct. 24, 1978 in the name of T. H. Shepherd. According to the process described in this United States patent male and female mold members are prepared from a thermoplastic composition by injection molding. The plastic mold parts are then used to mold spherical corneal contact lenses, one of the molding surfaces being provided with an integral, flexible circumferential ring which defines the periphery of the resulting lens. The material which will constitute the lens is charged between the two mold parts, the mold parts are contacted and during molding, the molding material contracts causing the two mold portions to move towards each other. Once the molding is completed the mold parts are separated and the resulting contact lens is removed in a condition ready for use except for cleaning and polishing of the edges.

It is an object of the present invention to provide a molding apparatus and a method using the apparatus for fabricating toric contact lenses at relatively low cost without the need for extensive and expensive manual finishing operations.

Another object of the present invention is to produce a toric-shaped contact lens, which may be either hard or flexible, in a closed mold system which compensates for shrinkage that occurs on polymerization.

It is also an object of this invention to provide a method for producing cast toric lenses in a closed mold system, such lenses having the desirable optical and fitting characteristics of machined and polished lenses.

These and other objects will be apparent from the following description.

SUMMARY OF THE INVENTION

The present invention comprises a novel form of a variable shape casting mold and a method of utilizing such a mold to produce toric contact lenses. The mold comprises a male portion, a female portion, either the male portion or the female portion or both being flexible, and a circumferential torque rim about the flexible portion. The male portion has a molding surface, and, in the preferred embodiments a substantially cylindrical support segment having the molding surface attached circumferentially around the lower portion of the support segment. The molding surface has a pre-determined curvature which will provide one of the surfaces of the contact lens. The female portion similarly has a second molding surface and, in the preferred embodiments, a hollow cylindrical support segment. The inner diameter of said cylindrical support segment is substantially equivalent to the external diameter of said support segment of the male portion. The diameters are pre-determined so that there is sufficient clearance for the male support segment to be slidable insertable into the female support segment and to permit excess monomer or other material used in the process to flow out between the two segments. The clearance, however, should not be so great as to permit the axis of the two segments to be non-aligned to a degree which would adversely affect the optical centering of the lens to be produced.

Surrounding the flexible portion, be it the female portion or the male portion (preferably the female portion), is a circumferential torque ring which applies pressure to the flexible portion, the torque ring having adjustable impingement means such as screws or the like for deforming the flexible portion into the desired toric configuration. Desirably there are at least two impingement means but there can be more, e.g., 3 or 4.

DETAILED DESCRIPTION OF THE INVENTION

The present invention in its preferred aspect, employs a flexible female mold portion to provide a finished lens with a toric configuration on the front or optical surface. The invention also includes the use of a male mold portion, desirably flexible, to obtain a toric configuration on the base or posterior surface of the resulting contact lens. The invention will now be described first with reference to the flexible female mold portion, then with respect to the flexible male mold portion.

Figures 1, 2, 3:
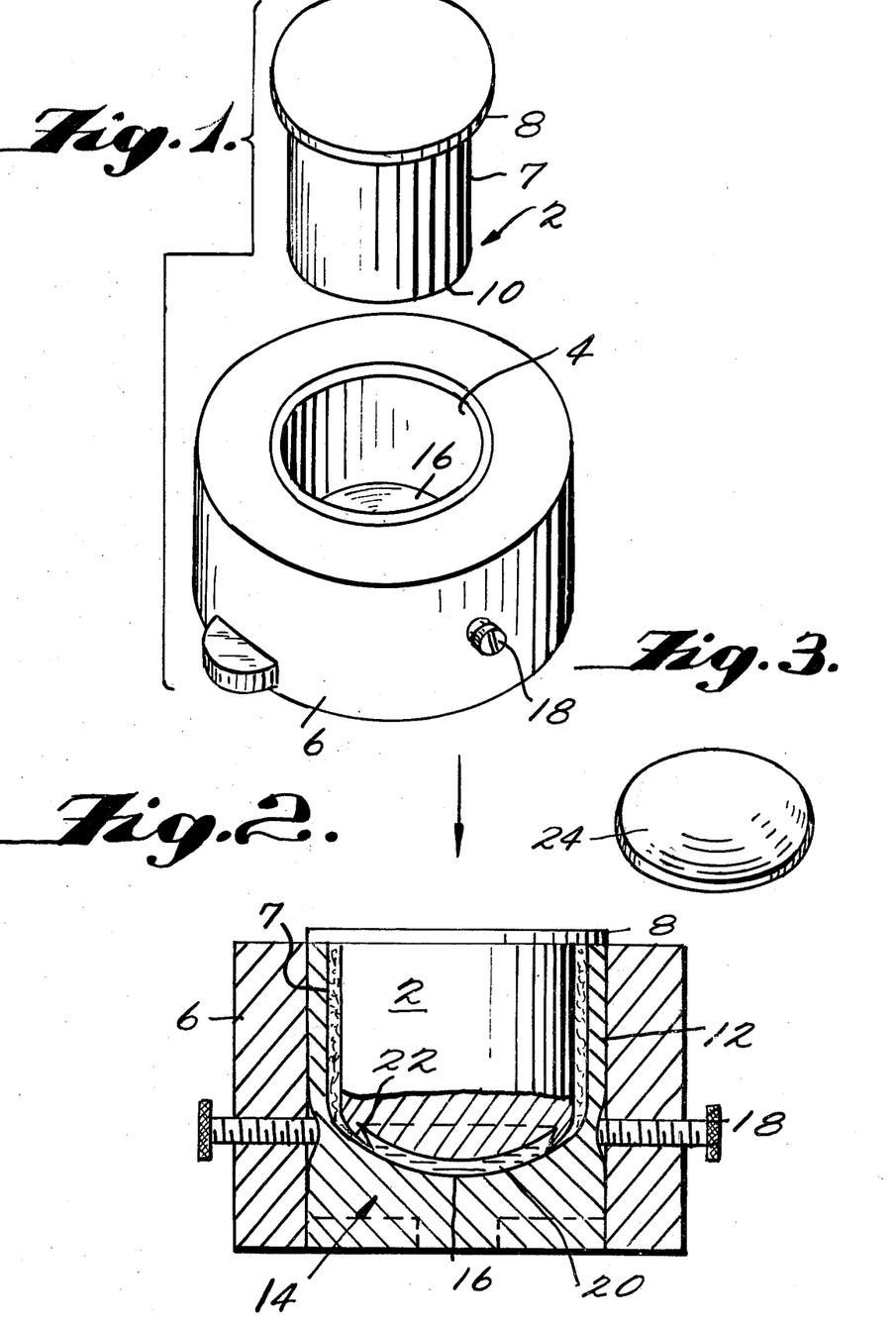
FIG. 1 is an elevated perspective view of the lens mold and torque ring in position about the lower portion of the mold piece.
FIG. 2 is a plan cross-sectional view of the lens mold in the closed position and the circumferential torque ring in position applying a shaping force to the lower mold part.
FIG. 3 is a toric contact lens produced according to the invention.

As shown in FIGS. 1 and 2, the mold comprises a male molding portion 2 which may be flexible or rigid, a flexible female molding portion 4 and a circumferential torque ring 6. Preferably male portion 2, includes a substantially cylindrical support segment 7 having, optionally, attached to the upper end thereof a rim 8. In the preferred embodiment, because of savings in mold materials, cylindrical support segment 7 is hollow as shown. Support segment 7 is closed by molding surface 10 circumferentially attached to the bottom of support segment 7. The curvature of molding surface 10 is selected in order to correspond with the optical requirements of the lens to be produced. The curvature may be entirely spherical, aspherical or combinations of both.

Desirably, flexible female molding portion 4 includes a cylindrical support segment or wall 12 set in a base 14 set circumferentially thereto and a molding surface 16 set internally in cylindrical support segment 12. As with the male molding surface 10, the curvature of female molding surface 16 is initially predetermined, and in operation is varied in order to provide female molding surface 16 with the desired toric configuration.

The circumferential torque ring 6 is provided with two opposing set screws 18 which, when rotated inwardly, impinge on and deflect the lower, flexible female mold portion 4. Ring 6 has an internal diameter which is slightly lower than the external diameter of cylindrical support segment 12 so that ring 6 may be conveniently removed and attached to the lower mold portion or moved from one mold to another. The ring is preferably fabricated from metal such as brass or the like.

During the operation of the process, which will be discussed in greater detail below, the configuration of the lower portion of the mold is adjusted by impinging the set screws of the mold, then the material 20 which will eventually constitute the contact lens is placed in the female portion of the mold. The male portion is placed into the female portion and any excess molding material 20 is squeezed out. It will be understood that in the embodiment shown in the figures no runoff channels in the cylindrical portions are shown or provided. However, providing mold having such channels is within the scope of the present invention.

In a preferred embodiment of the invention the male mold portion 2 is provided with a circumferential flexible rim 22 around male molding surface 10. When the male mold member 2 is urged against molding surface 16 of the female mold portion 4 the flexible rim 22 moves inwardly towards the central vertical axis of the mold definding sloped edges along the sides of the lens thus molded. In a less desirable embodiment but still contemplated as being within the scope of the invention, it is female molding surface 16 (rather than male molding surface 10) that is provided with the circumferential flexible rim 22.

The two parts of the mold containing the molding material are then subjected to the molding processes which are discussed in detail below. During the molding stage, the molding material may contract and the contraction may be as much as 20% of the volume of the molding material originally present between the molding surfaces. If desired, external pressure can be applied to ensure that the molding surfaces do approach each other as closely as possible. However, the application of such external pressure is optional and, while in certain cases, may give rise to improved results, the operation of the processes will proceed without external pressure. After the molding step is completed, the molds are separated and the lens 24 "FIG. 3" so produced removed from the mold in a condition ready to use except for cleaning and polishing of the edges. The optical surfaces—that is to say, the contact surfaces—are in their desired state.

The radius of the female mold portion 4 is adjusted by placing it into the circumferential torque ring 6 and adjusting the opposing set screws. The female mold member provides the optical curve to the resulting lens and a mold is selected or fabricated having the desired radius. The female mold portion 4 and attached circumferential torque ring assembly 6 are placed into a Keratometer and the set screws 18 are adjusted, optionally using a micrometer, to vary the radius of the female mold portion 4 in both the horizontal and vertical plane with respect to the finished lens. As an example, starting with a spherical radius of 8.00 mm for the female mold portion 4, the mold portion 4 plus torque ring assembly 6 are placed in a Keratometer, the set screws 18 may be tightened to impinge on the female mold portion 4 to flatten the horizontal radius, to say 8.10 mm and steepen the vertical radius, to say 7.90 mm. Thus using predetermined radii in conjunction with a known base curve radius will result in known horizontal and vertical powers. The greater the radii differential, the greater the difference between horizontal and vertical powers, hence the greater the cylinder. An example for calculating the base radius, center thickness, optical zone diameter and optical power is given below.

Figure 4:
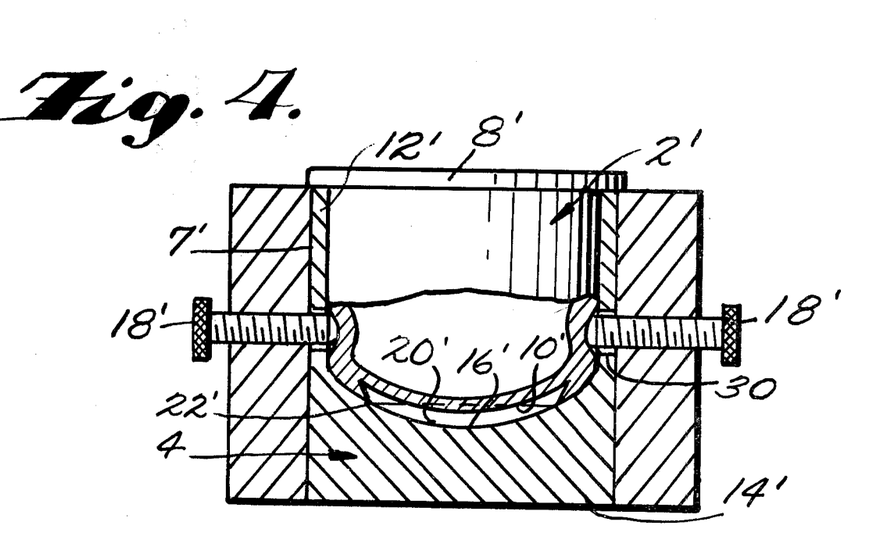
FIGS. 4 and 5 are plan cross-sectional views of the lens mold in the closed position and the circumferential torque ring positioned to apply a shaping force to the flexible upper mold part.
Figure 5:
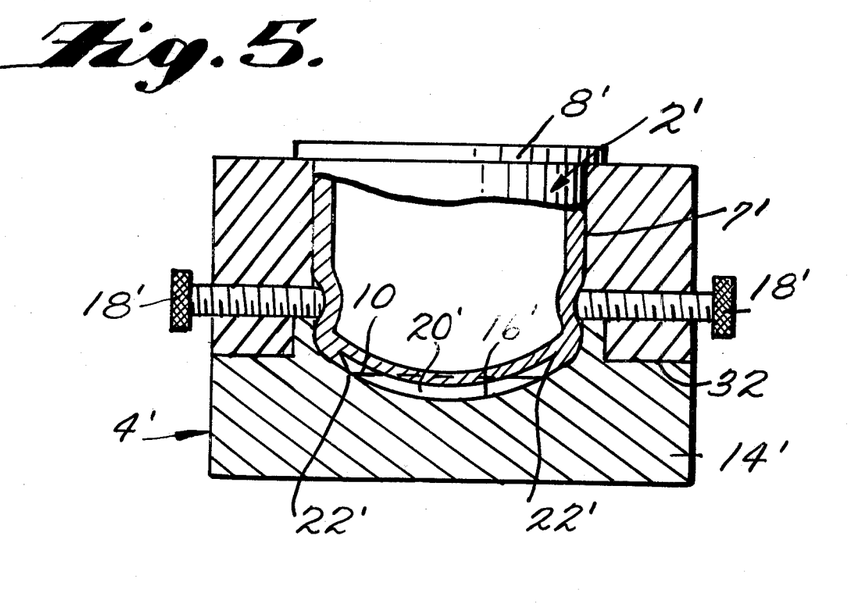

In an alternative embodiment of the present invention, as illustrated in FIGS. 4 and 5 the male molding portion is flexible and results in a toric configuration on the base or posterior surface of the resulting contact lens. Thus in FIG. 4 the flexible male molding portion 2' includes a substantially cylindrical flexible support segment 7' having, optionally, attached to the upper end thereof a rim 8'. The support segment 7' is closed by molding surface 10' which is circumferentially attached to the bottom of support segment 7'. The curvature of the molding surface 10' is at least initially selected to correspond with the optical requirements of the lens to be produced while the flexible male molding portion 2' is tensioned. The female mold portion 4' includes a cylindrical support segment or wall 12' set in a base 14' set circumferentially thereto and a molding surface 16' internally of cylinder 12'. The cylindrical support wall 12' is provided with a number of apertures 30 corresponding with the number and configuration of the set screws 18' passing through the apertures 30. The apertures 30 allow the set screws, carried by the circumferential torque ring 6', when suitably rotated to impinge on and deflect the lower, flexible male mold portion 2' as illustrated in FIG. 4, but exaggerated somewhat to show full details.

Another arrangement using a flexible male mold portion is shown in FIG. 5 which the female molding portion 4' has a shoulder 32 approximately the same circumference and for support of the circumferential torque ring 6'. As with the embodiment of FIG. 4 the male molding portion is flexed directly by the action of the opposing set screws 18' to the desired toric configuration.

In use the flexible male molding member requires somewhat different procedures and techniques than are used with a flexible female mold portion, as described above. Accordingly the ingredients, e.g., polymerizable, vulcanizable, crosslinkable, or other mixtures which will constitute the contact lens is placed in the female portion of the mold. The male portion is placed into the female portion and urged against the female molding surface while any excess molding material is squeezed out. Although no runoff channels are shown in the cylindrical portions of FIGS. 4 and 5, it is to be understood that they are within the ambit of the present invention. Next the radius of the male mold portion which will constitute the back or posterior surface of the lens is determined and this is done in the same manner as described above in the instance using the flexible female mold portion.

Subsequent to curing of the lens-forming composition, which is described below in detail, the set screws are loosened and the mold assembly is taken apart resulting in a contact lens having a spherical base curve and a toric optical curve. Any irregularity in the lens edge can be finished by conventional techniques such as with a lathe. The edge finishing may be accomplished on an eccentric lathe mandrel to produce a prism and truncation may be applied, if desired.

The disclosed process is advantageous over prior art methods in that a lens is cast directly from the desired lens-forming material, polishing of the optical surfaces is generally not required, only minimum hand finishing of the lens edges is required, and the overall manufacturing is much less labor intensive than with prior procedures, e.g., lathe procedure.

It will be understood that the number and placement of adjusting screws about the circumference of ring 6 may be varied depending upon the desires of equipment design and the exact shape of the lens to be fabricated. For convenience, two screws 18 are illustrated, one positioned directly across from the other.

FIG. 2 is illustrative as it shows the extended set screws 18 in exaggerated detail pushing upon and compressing the female mold portion 4. The positioning of the screws with respect to the lens is at or about the horizontal axis of the lens, in the illustration; however, it will be understood that the exact positioning of the set screws 18 may be varied, again depending on the experience and desires of the operator. It is the distortion on the flexible mold part, be it the female part as in FIGS. 1 and 2, or the male part as in FIGS. 4 and 5, which provides for the toric configuration of the resulting lens. A micrometer may be used to tighten the set screw on the appropriate flexible mold portion, such as by turning the micrometer the desired number of turns to arrive at the predetermined diameter values.

The mold members may be fabricated in any conventional manner so long as the female mold member is flexible to the extent required for achieving the desired lens configuration. It is preferred to use mold members made in a manner similar to that described in the Shepherd application, mentioned above. Accordingly, suitable materials for construction of the molds are thermoplastic resins which are inert to the polymerizing media, which have the requisite flexibility under torque and polymerization conditions, which do not strongly adhere to the polymerized articles and which can themselves be molded to an optical quality surface. Especially suitable materials include polyolefins such as low, medium and high density polyethylene, polypropylene, propylene copolymers known as polyallomers, polybutene-1, poly-4-methylpentene-1, ethylene vinyl acetate and ethylene vinyl alcohol copolymers, and ethylene copolymers such as polyionomers. Other suitable materials are polyacetal resins and acetal copolymer resins, polyarylethers, polyphenylene sulfides, polyaryl sulfones, polyarylether sulfones, Nylon 6, Nylon 66 and Nylon 11, thermoplastic polyesters, polyurethanes, and various fluorinated materials such as fluorinated ethylene-propylene copolymers and ethylene-fluoroethylene copolymers.

The choice of a particular thermoplastic material for use in fabrication of molds is governed by the requisite flexibility and polymerization conditions to be used. In general, a suitable guide is the heat distortion temperature at 66 psi fiber stress (ASTM D648) of the plastic material. Thermoplastic molds generally suitable in this invention at temperatures ranging from 20° C. to 40° C. and more, below the heat distortion temperatures of the thermoplastic material up to a few degrees, suitably 10° C., and more, above the heat distortion temperature.

For example, low density polyethylene shows a heat distortion temperature of 40°–50° C., and acceptable results under light loading are obtained with this material at polymerization temperatures of from 30° to above 70° C. Above 70° C., some distortion of optical surfaces may occur.

Whereas, with polypropylene, which has a heat distortion temperature in the range of 100° to 120° C., with little or no applied pressure, acceptable results are obtained at polymerization temperatures from about 65° to 120° C. Below 65° C., flexibility of the plastic rim is not sufficient to compensate for shrinkage, and above 120° C., distortion of optics occurs.

High polymerization temperatures may be used for materials such as nylons, polyphenylene sulfides, polysulfones and fluorinated polymers showing higher heat distortion temperatures.

In addition, it is possible to operate at lower polymerization temperatures by increasing the "load" or mold closing pressure applied. For example, shrink marks or surface voids may appear in cast lenses made with the polypropylene molds of this invention at a polymerization temperature of below 65° C. at light closing pressure applied to the mold; however, if the closing pressure is increased to, for example, 10 psi, (calculated on the total mold area) lenses free from surface blemishes are obtained. Thus the requisite flexibility of the mold rim may be obtained through a combination of polymerization temperature and closing pressure. The male mold member may be constructed from and exhibited properties different from the female mold member as flexibility of the male mold member itself is not required, only the ring thereon, when present.

It is noted that the male mold portion 2 has the rim 22 integrally formed at the periphery of the male molding surface 7. The junction of the base of the rim 22 with the surface 7 forms the posterior portion of the edge of the lens, while the mating of the rim with the female mold portion 4 forms the anterior shape of the edge. The overall thickness of the edge thus formed is the "height" of the rim 22 less the distance the rim flexes to compensate for the shrinkage that occurs on polymerization. Depending on the edge thickness desired, the height of the rim 22 may vary from about 0.05 mm for a very thin edge, to as much as 0.3 mm for a rather thick, rounded edge.

The outside diameter of the male mold half must be sufficiently smaller than that of the female half to permit escape of excess of the material to be polymerized upon closing the mold. Tapering of the male and female halves aids in removal of excess material but is not critical. In general, the male half is preferably from 0.1 to 0.3 mm smaller in diameter than the female half. If the size difference is too great, for example 0.5 mm, then alignment of the optical centers of the two halves becomes problematic, although the invention is still operable.

The design of the lenses produced by this invention is not restricted to any particular set of parameters. Both anterior and posterior surfaces of the lenses may consist of entirely spherical curves or aspherical curves or combinations of both. For example, the central portion of the lens may consist of spherical curves on both the anterior and posterior surface, and the pheriphery of the anterior surface may consist of a steeper or flatter spherical curve, and the periphery of the posterior surface may be aspheric to achieve improved fitting characteristics. A wide variety of materials can be employed in the novel process to fabricate contact lenses which have at least one surface which is toric in configuration. Such materials may be hydrophilic, or hydrophobic, or mixtures of both. The resulting contact lenses may be hard lenses as exemplified by the rigid acrylic plastics, most notably poly (methyl methacrylate); or such contact lenses may be flexible, hydrophobic lenses as exemplified by the unsubstituted and fluoro-substituted polyethylenes, the silicone elastomers, etc.; or such contact lenses may be the so-called hydrophilic polymeric lenses desirably having a slight three-dimensional structure such as polymers of 2-hydroxyethyl methacrylate; or such contact lenses may be flexible, hydrophilic lenses fabricated from the products of hydrolyzed collagen; or gelatin, etc. Such hydrophilic polymeric lenses are water-insoluble, water-swellable polymers and when immersed in water or saline solution swell to attain their final dimensions. The resulting water-swollen lenses may be properly termed hydrogel lenses.

Illustrative materials which are useful in the fabrication of contact lenses are well documented in the prior art as illustrated by one or more of the following U.S. Pat. Nos. 2,976,576; 3,220,960; 3,937,680; 3,948,871; 3,949,021; 3,983,083; 3,988,274; 4,018,853; 3,875,211; 3,503,942; 3,532,679; 3,621,079; 3,639,524; 3,700,761; 3,721,657; 3,758,448; 3,772,235; 3,786,034; 3,803,093; 3,816,571; 3,940,207; 3,431,046; 3,542,461; 4,055,378; 4,064,086, and 4,062,627.

As general classes of preferred monomers for fabricating the hydrophilic polymeric materials there can be employed the hydroxy($C_1$-$C_4$ alkyl) methacrylates and acrylates; N-vinylpyrrolidone and the ($C_1$-$C_4$)alkyl-N-vinylpyrrolidones; acrylamide; the N-($C_1$-$C_4$)alkyl- and the N,N-di($C_1$-$C_4$)alkylacrylamides and the methacrylamides; and the vicinal-epoxyalkyl methacrylates and the acrylates, such as glycidyl methacrylate; or mixtures, of the foregoing, with or without additional monomers or modifiers such as the $C_1$-$C_6$ alkyl methacrylates, the unsaturated amines; and preferably with a crosslinking agent or other ingredient or means to effect slight crosslinking of the resulting polymer thus imparting to said polymer a three-dimensional structure.

When a hydrophilic lens is to be formed preferably the polymerizable mixture employed comprises a hydroxy lower alkyl acrylate or methacrylate or hydroxy lower alkoxy lower alkyl acrylate or methacrylate, e.g. 2-hydroxyethyl acrylate, 2-hydroxyethyl methacrylate, diethylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate or dipropylene glycol monoacrylate; N-methylmethacrylamide, and N,N-dimethylacrylamide. The most preferred monomers are the hydroxyalkyl acrylates and the methacrylates, particularly 2-hydroxyethyl methacrylate.

If the hydrophilic monomer gives a product which is water soluble, e.g. polyacrylamide, it is necessary to employ a copolymerizable monomer to render it water swellable, rather than water soluble. The copolymerizable monomer can be used in varying amounts to achieve this purpose at taught in the art. Such comonomers can include methyl acrylate, ethyl acrylate, butyl acrylate, methyl methacrylate, ethyl methacrylate, propyl methacrylate, and butyl methacrylate; the lower alkoxyethyl acrylates and methacrylates, e.g. methoxyethyl acrylate, methoxyethyl methacrylate, ethoxyethyl methacrylate, triethylene glycol methacrylate, and glycerol monomethacrylate.

The polymerizable mixture can comprise unsaturated amines such as the alkylaminoalkyl acrylates and methacrylates, e.g., diethylaminoethyl acrylate, diethylaminoethyl methacrylate, dimethylaminoethyl acrylate, and dimethylaminoethyl methacrylate.

Desirably, a cross-linking agent is employed in the polymerizable mixture in an amount of 0.1 to 2.5% by weight, preferably in an amount not exceeding 1.0 percent by weight, based on the total weight of the monomers.

Typical examples of cross-linking agents include ethylene glycol diacrylate, ethylene glycol dimethacrylate, propylene glycol dimethacrylate, diethylene glycol dimethacrylate, dipropylene glycol dimethacrylate, divinylbenzene, divinyl toluene, allyl maleate, triallyl malamine, N,N'-methylene-bis-acrylamide, glycerine trimethacrylate, ethylene glycol diester of itaconic acid, triallyl phosphite, polyallyl glucose, and glucose dimethacrylate.

The disclosures of all of the above-mentioned patents are hereby incorporated by reference.

The following table may be consulted to produce a toric contact lens using the molding apparatus and methods according to the present invention. In this illustration a hydrophilic lens is produced having a base curve of 8.50 mm (wet) and a diameter of 13.00 mm (wet) in the low minus powers. First the required prescription is determined, the horizontal and vertical powers. As an example, for desired a wet horizontal of −3.50 and a wet vertical of −2.50 the mean wet power of −3.00 is determined. This is the spherical mold to be selected. As indicated in the following table the radius is 7.56 mm. Once the mold size is selected, say for a flexible female mold part, the torque ring is positioned and the adjustment screws tightened towards the axis of the torque ring while the mold plus ring are in a Keretometer to the values required, as shown in the table. The optical surface mold is now ready for charging and completion of the molding process, as described above.

TABLE

| Dry Base Radius 7.08 mm Wet Base Radius 8.50 mm | | | Dry Diameter 10.85 mm Wet Diameter 13.00 mm | |
|---|---|---|---|---|
| Wet Power | Dry Power | Center Thickness | Optical Zone | Radius |
| −0.25 | −0.36 | .15 | 9.40 | 7.17 |
| −0.50 | −0.72 | .15 | 9.40 | 7.20 |
| −0.75 | −1.09 | .15 | 9.40 | 7.24 |
| −1.00 | −1.45 | .15 | 9.40 | 7.27 |
| −1.25 | −1.81 | .14 | 9.40 | 7.31 |
| −1.50 | −2.17 | .13 | 9.40 | 7.35 |
| −1.75 | −2.54 | .12 | 9.40 | 7.38 |
| −2.00 | −2.90 | .11 | 9.40 | 7.42 |
| −2.25 | −3.26 | .10 | 9.30 | 7.44 |
| −2.50 | −3.62 | .10 | 9.20 | 7.48 |
| −2.75 | −3.99 | .10 | 9.10 | 7.52 |
| −3.00 | −4.35 | .10 | 9.00 | 7.56 |
| −3.25 | −4.71 | .10 | 8.90 | 7.59 |
| −3.50 | −5.07 | .10 | 8.80 | 7.63 |
| −3.75 | −5.43 | .10 | 8.70 | 7.67 |
| −4.00 | −5.80 | .10 | 8.60 | 7.72 |
| −4.25 | −6.16 | .10 | 8.50 | 7.76 |
| −4.50 | −6.52 | .10 | 8.40 | 7.80 |
| −4.75 | −6.88 | .10 | 8.30 | 7.84 |
| −5.00 | −7.25 | .10 | 8.20 | 7.88 |
| −5.25 | −7.61 | .10 | 8.10 | 7.92 |

The following examples are further illustrative, but not limiting, of the present invention using the molding apparatus as illustrated in FIGS. 1 and 2. It will be appreciated that various polymerizable mixtures suitable for fabricating contact lenses and adjustment procedures, either to the female mold portion, as below, the male mold portion, or both, may be used. Unless otherwise indicated all parts and percentages are by weight.

EXAMPLE 1

A hydrophilic contact lens having a toric front surface was prepared using a lens mold of polypropylene of the type described and illustrated in U.S. Pat. No. 4,121,896, issued Oct. 24, 1978. The material used was composed substantially of 2-hydroxyethyl methacrylate (HEMA), and due to the fact that poly(HEMA) swells in water or a physiologic solution by a factor of say 1.2, the wet lens that results in lesser in power by a factor of approximately 69%. Thus the dry lens, as fabricated, and the wet lens resulting therefrom had the following values.

| | Dry | Wet |
|---|---|---|
| base curve | 7.08 mm | 8.50 mm |
| outside diameter | 10.85 mm | 13.00 mm |
| horizontal power | −5.07 | −3.50 |
| vertical power | −3.62 | −2.50 |

The mold was selected using the above Table having an optical curve spherical radius of 7.56 mm and a base curve radius of 7.08 mm. This combination of optical and base curves produced a spherical lens with a dry power of −4.35 and a wet power of −3.00.

After selecting the proper mold sizes the torque ring was placed over the flexible optical curve mold and the adjustment screws tightened only to the point of contact with the mold. Next the assembly was placed in a Keretometer and the screws adjusted to flex the mold to have the desired radii, which in the present instance was a horizontal radius of 7.63 mm and a vertical radius of 7.48 mm. The two torque screws were tightened evenly until the desired radii were observed.

Having thus adjusted the mold, the assembly was removed from the Keretometer and charged with 1 ml. of a polymerizable mixture having the following ingredients:

| Component | Parts by Weight |
|---|---|
| 2-hydroxyethyl methacrylate | 99. |
| diethylene glycol monomethacrylate | 0.3 |
| ethylene glycol dimethacrylate | 0.3 |
| methacrylic acid in trace amounts plus other impurities | 0.4 |

Next the male base curve mold with a radius of 7.08 mm was placed into the adjusted, charged female optical curve mold and retained in position by its own weight. The insertion displaced a small amount of the HEMA monomer out and forced any art bubbles present from the mold assembly. The mold assembly was placed in a circulating air oven at 45° C. for 1½ hours to polymerize the monomer. After polymerization and cooling the mold parts were pulled apart and a hard, dry lens removed. The lens was then finished by polishing the edge to remove some slight roughness. The lens was then placed in a Vertexometer to check the horizontal and vertical power and to locate the lens axis. In this example the axis was maintained at 90° to the truncation. The finished lens was placed in a physiological saline solution and had a horizontal power of −3.50 (wet) and a vertical power of −2.50 (wet). The finished lens had a toric front or optical surface and was found suitable for use as a contact lens.

EXAMPLE 2

The procedure of example 1 is repeated this time using the following polymerizable mixture:

| Component | Parts by Weight |
|---|---|
| 2-hydroxyethyl methacrylate | 55 |
| N,N-dimethyl acrylamide | 45 |
| Water, distilled | 30 |
| diethylene glycol dimethyl ether | 20 |
| methylene-bis-acrylamide | 0.3 |
| diisopropyl percarbonate | 0.3 |

The resulting lens is leached and equilibrated in a 0.9% saline solution.

EXAMPLE 3

The procedure of example 1 is repeated this time using as the polymerizable mixture:

| Component | Parts by Weight |
|---|---|
| 2-hydroxyethyl methacrylate | 100 |
| water, distilled | 30 |
| ethtylene glycol dimethyl ether | 25 |
| triethyleneglycol dimethacrylate | 0.4 |
| di-isopropyl percarbonate | 0.2 |

EXAMPLE 4

The general procedure of example 1 is repeated as regards molding but modified as regards polymerization conditions to form a rigid contact lens of cross-linked polymethyl methacrylate. The following polymerizable mixture is used:

| Component | Parts by Weight |
| --- | --- |
| methyl methacrylate | 98 |
| ethylene dimethacrylate | 20 |
| di-t-butylcyclohexylperoxy dicarbonate | 0.3 |

This mixture, inside the mold, is polymerized in an air oven at 60° C. for 1½ hours.

EXAMLE 5

The general procedure of example 1 is repeated this time using a two part room temperature vulcanizable transparent methyl silicone liquid. The charged and adjusted mold is placed in an air oven at 135° C. for two hours.

What is claimed is:

1. A process of casting contact lenses in an adjustable mold which includes:
    (i) mold portion including an optical curve molding surface having a principal longitudinal axis, said optical curve molding surface having a predetermined curvature to form the optical curve surface of the desired contact lens;
    (ii) a second mold portion including a base curve molding surface having a principal longitudinal axis, said base curve molding surface having a predetermined curvature to form the base curve surface of the desired contact lens; and
    (iii) tensioning means about said first mold portion for flexing said portion and positioning said optical curve molding surface into the desired configuration;
said process comprising:
    (a) adjusting said tensioning means and flexing said first mold portion to define the desired configuration for said optical curve molding surface;
    (b) charging a mixture comprising vulcanizable or polymerizable constituents to the first mold portion of said adjustable mold;
    (c) closing the mold by placing the first mold portion and the second mold portion in alignment with each other; and
    (d) subjecting the resulting closed mold system to activating conditions for a period of time sufficient to effect the desired degree of vulcanization or polymerization of said mixture to produce a contact lens having the desired optical curve in accordance with said adjustment.

2. The process of claim 1 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

3. The process of claim 1 wherein said mixture comprises 2-hydroxyethyl methacrylate.

4. A process of casting contact lenses in an adjustable mold which includes:
    (i) mold portion including an optical curve molding surface having a principal longitudinal axis, said optical curve molding surface having a predetermined curvature to form the optical curve surface of the desired contact lens;
    (ii) a flexible second mold portion including a base curve molding surface having a principal longitudinal axis, said base curve molding surface having a predetermined curvature to form the base curve surface of the desired contact lens; and
    (iii) tensioning means in contact with said second mold portion for flexing said portion and positioning said optical curve molding surface into the desired configuration;
said process comprising:
    (a) charging a mixture comprising vulcanizable or polymerizable constituents to the first mold portion of said adjustable mold;
    (b) closing the mold by placing the first mold portion and the second mold portion in alignment with each other;
    (c) adjusting said tensioning means and flexing said second mold portion to define the desired configuration for said base curve molding surface; and
    (d) subjecting the resulting closed mold system to activating conditions for a period of time sufficient to effect the desired degree of vulcanization or polymerization of said mixture to produce a contact lens having the desired base curve in accordance with said adjustment.

5. The process of claim 4 wherein said mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

6. The process of claim 4 wherein said mixture comprises 2-hydroxyethyl methacrylate.

7. A process of producing hydrophilic contact lenses having a 3-dimensional network which comprises the steps of:
    (i) a flexible, thermoplastic female portion including an optical cure molding surface having a principal longitudinal axis, said optical curve molding surface having an adjustable curvature to form the optical curve surface of the desired contact lens, said female portion comprising a hollow cylindrical portion having an open upper end and a closed lower end;
    (ii) a male portion including a substantially cylindrical support portion and a base curve molding surface having a principal longitudinal axis, said base curve molding surface having a predetermined curvature to form the base curve surface of the desired contact lens; and
    (iii) adjustment means operatively associated and in contact with said female mold portion at about the horizontal plane of said optical mold surface for flexing said female mold portion and said optical curve molding surface into the desired configuration;
    (a) adjusting said female mold portion by said adjustment means and flexing said optical cuve molding surface into the desired configuration;
    (b) charging a polymerizable mixture comprising hydrophilic monomer to said female portion of the mold;
    (c) closing the mold by slidably engaging the cylindrical support portion of the male portion with the hollow cylindrical portion of the female portion and retaining said mold in a closed condition during the polymerization step;
    (c) subjecting the closed mold system to activating conditions for polymerization and allowing said polymerization mixture to contract for a period of time sufficient to achieve the desired degree of polymerization, and (d) recovering the resulting polymeric product having the shape of a contact lens.

8. The process of claim 7 wherein said mixture comprises at least one hydrophilic acrylic monomer.

9. The process of claim 8 wherein said mixture comprises 2-hydroxyethyl methacrylate.

10. The process of claim 7 wherein said mixture comprises N-vinylpyrrolidone.

11. The process of claim 7 wherein said mixture comprises an N-alkyl-substituted acrylamide or methacrylamide.

12. A process according to claim 7 wherein said mixture contains a major amount of ethylene glycol monomethalcrylate.

13. A process according to claim 7 wherein said polymerization is effected in the presence of free radical initiators or radiation.

14. A process according to claim 13 wherein the polymerization conditions comprise temperatures in the range of 40° C. below to 10° above the heat distortion temperature at 66 psi fiber stress for the thermoplastic material of said mold portion.

15. A process according to claim 14 including applying external pressure to the mold during the polymerization step.

16. A process for casting a contact lens having a toric-shaped optical curve surface from a polymerizable mixture in a closed mold system which includes:

(i) a male mold portion including a substantially cylincrical support having a principal longitudinal axis and a base curve molding surface attached circumferentially to said cylindrical support, said base curve molding surface having a predetermined curvature to form the base curve surface of the resulting contact lens;

(ii) a flexible, thermoplastic female portion comprising a hollow cylindrical portion having principal longitudinal axis and having an open upper end and a closed lower end, the internal diameter of said female cylindrical portion being sufficiently greater than the external diameter of said male support portion to permit frictionless insertion of the male portion thereto, the female portion being circumferentially closed at the lower end thereof by an integral optical curve molding surface having an adjustable curvature to form the optical curve surface of the resulting contact lens;

(iii) an integral rim portion flexible inwardly towards the axis of both of said molding surfaces attached circumferentially to, and integral with, one of said molding surfaces and having an axis common with the principal longitudinal axis of the mold portion; and (iv) adjustment means operatively associated and in contact with said female mold portion at about the horizontal plane of said optical mold surface for flexing said female mold portion and in turn said integral optical curve surface into a toric configuration;

said process including the sequential steps of:

A. adjusting said adjustment means and, in turn, said optical curve molding surface into the desired toric configuration;

B. charging a polymerizable mixture comprising hydrophilic monomer into the female portion of said mold;

C. closing the mold by slidably engaging the cylindrical portion of the female portion and seating said flexible rim circumferentially on the opposite molding surface while retaining said mixture between said molding surfaces and said flexible rim portion to form a totally enclosed space;

D. subjecting the closed mold to polymerization conditions causing said polymerizable material to contract during polymerization, urging said molding surfaces towards each other and causing said rim portion to flex inwardly in a uniform manner during such contraction; and E. removing the thus molded contact lens from the mold.

17. A process according to claim 16 wherein external pressure is applied to the closed mold during polymerization step (D).

18. A process according to claim 16 wherein any excess polymerizable mixture is squeezed out of said enclosed space as the male and female portions are engaged in step (C).

19. A process according to claim 16 wherein mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

20. A process for casting a contact lens having a toric-shaped base curve surface from a polymerizable mixture in a closed mold system which includes:

(i) a flexible, thermoplastic male mold portion including a substantially cylindrical support having a principal longitudinal axis and a base curve molding surface attached circumferentially to said cylindrical support, said base curve molding surface having an adjustable curvature to form the base curve surface of the resulting contact lens;

(ii) a female portion comprising a hollow cylindrical portion having principal longitudinal axis and having an open upper end and a closed lower end, the internal diameter of said female cylindrical portion being sufficiently greater than the external diameter of said male support portion to permit frictionless insertion of the male portion thereto, the female portion being circumferentially closed at the lower end thereof by an integral optical curve molding surface having a predetermined curvature to form the optical curve surface of the resulting contact lens;

(iii) an integral rim portion flexible inwardly towards the axis of both of said molding surfaces attached circumferentially to, and integral with, one of said molding surfaces and having an axis common with the principal longitudinal axis of the mold portion; and (iv) adjustment means operatively associated and in contact with said flexible male mold portion at about the horizontal plane of said base curve mold surface when the mold is closed for flexing said male mold portion and in turn said integral optical curve surface into a toric configuration;

said process including the sequential steps of:

A. charging a polymerizable mixture comprising hydrophilic monomer into the female portion of said mold;

B. closing the mold by slidably engaging the cylindrical portion of the female portion and seating said flexible rim circumferentially on the opposite molding surface while retaining said mixture between said molding surfaces and said flexible rim portion to form a totally enclosed space;

C. adjusting said adjustment means and in turn said base curve molding surface into the desired toric configuration;

D. subjecting the closed mold to polymerization conditions causing said polymerizable material to contract during polymerization, urging said molding surfaces towards each other and causing said rim portion to flex inwardly in a uniform manner during such contraction; and E. removing the thus molded contact lens from the mold.

21. A process according to claim 20 wherein external pressure is applied to the closed mold during polymerization step (D).

22. A process according to claim 20 wherein any excess polymerizable mixture is squeezed out of said enclosed space as the male and female portions are engaged in step (C).

23. A process according to claim 20 wherein mixture comprises at least one polymerizable monomer selected from the group consisting of acrylic monomers, N-alkylacrylamide, N,N-dialkylacrylamide, N-alkylmethacrylamide, N,N-dialkylmethacrylamide and N-vinylpyrrolidone.

24. A process of casting contact lenses in an adjustable mold which includes:

(i) mold portion including an optical curve molding surface having a principal longitudinal axis, said optical curve molding surface having a predetermined curvature to form the optical curve surface of the desired contact lens;

(ii) a second mold portion including a base curve molding surface having a principal longitudinal axis, said base curve molding surface having a predetermined curvature to form the base curve surface of the desired contact lens; and (iii) a rigid cylindrical rim tensioning means about said first mold portion, said tensioning means provided with a pair of opposing adjustible set screws for flexing said portion and positioning said optical curve molding surface into the desired configuration;

said process comprising:

(a) adjusting said tensioning means and flexing said first mold portion to define the desired configuration for said optical curve molding surface;

(b) charging a mixture comprising vulcanizable or polymerizable constituents to the first mold portion of said adjustable mold;

(c) closing the mold by placing the first mold portion and the second mold portion in alignment with each other; and (d) subjecting the resulting closed mold system to activating conditions for a period of time sufficient to effect the desired degree of vulcanization or polymerization of said mixture to produce a contact lens having the desired optical curve in accordance with said adjustment.

25. A process for casting a contact lens having a toric-shaped optical curve surface from a polymerizable mixture in a closed mold system which includes:

(i) a male mold portion including a substantially cylindrical support having a principal longitudinal axis and a base curve molding surface attached circumferentially to said cylindrical support, said base curve molding surface having a predetermined curvature to form the base curve surface of the resulting contact lens;

(ii) a flexible, thermoplastic female portion comprising a hollow cylindrical portion having principal longitudinal axis and having an open upper end and a closed lower end, the internal diameter of said female cylindrical portion being sufficiently greater than the external diameter of said male support portion to permit frictionless insertion of the male portion thereto, the female portion being circumferentially closed at the lower end thereof by an integral optical curve molding surface having an adjustable curvature to form the optical curve surface of the resulting contact lens;

(iii) an integral rim portion flexible inwardly towards the axis of both of said molding surfaces attached circumferentially to, and integral with, one of said molding surfaces and having an axis common with the principal longitudinal axis of the mold portion; and (iv) a rigid cylindrical rim adjustment means operatively associated and in contact with said flexible female mold portion at about the horizontal plane of said optical mold surface, said ring provided with a pair of adjustable set screws which engage said female mold for flexing said female mold portion and in turn said integral optical curve surface into a toric configuration;

said process including the sequential steps of:

A. adjusting said set screws and, in turn, said optical curve molding surface into the desired toric configuration;

B. charging a polymerizable mixture comprising hydrophilic monomer into the female portion of said mold;

C. closing the mold by slidably engaging the cylindrical portion of the female portion and seating said flexible rim circumferentially on the opposite molding surface while retaining said mixture between said molding surfaces and said flexible rim portion to form a totally enclosed space;

D. subjecting the closed mold to polymerization conditions causing said polymerizable material to contract during polymerization, urging said molding surfaces towards each other and causing said rim portion to flex inwardly in a uniform manner during such contraction; and E. removing the thus molded contact lens from the mold.

26. A contact lens mold comprising:

a male mold portion including a substantially cylindrical support portion and a first molding surface having a principal longitudinal axis, said molding surface having a predetermined curvature to form a first surface of said desired contact lens;

a female mold portion including a second molding surface having a principal longitudinal axis, said molding surface having a predetermined curvature to form a second surface of said desired contact lens, said female portion, comprising a hollow cylindrical portion having an open upper end and a closed lower end;

at least one of said male mold portion and said female mole portion being flexible; and torsioning means about said female mold portion for adjustably flexing at least one of said molding surface into a pre-determined configuration.

27. A mold in accordance with claim 26 including a flexible rim portion attached to one of said molding surfaces and having an axis common with the principal longitudinal axis of the molded portion.

28. A mold in accordance with claim 26 which is constructed of thermoplastic material.

29. A mold in accordance with claim 26 wherein said torsioning means includes a rigid cylindrical ring removably attached to said female mold portion.

30. A mold in accordance with claim 29 wherein said ring is provided with at least two adjustable set screws which engage said female mold portion adjacent said second molding surface and said female mold portion is flexible.

31. A mold assembly for producing a toric optical curve contact lens comprising:
- a base curve mold portion including a first molding surface having a principal longitudinal axis, said molding surface having a pre-determined curvature to form the base curve surface of said desired contact lens;
- an optical curve mold portion including a second molding surface having a principal longitudinal axis having a pre-determined curvature to form an optical curve surface of said desired contact lens, the base curve mold or the optical curve being flexible; and
- an optical curve mold adjustment means operatively associated with said flexible mold portion for flexing said mold into the desired configuration and retaining that configuration during lens molding operations.

32. A mold assembly according to claim 31 wherein said adjustment means includes a circumferential rim positioned about the outside circumference of said optical curve mold.

33. A mold assembly for casting a contact lens having at least one toric surface, said mold assembly including:
- a male mold portion including a substantially cylindrical support portion having a principal longitudinal axis and a first molding surface attached circumferentially to said cylindrical support portion, said molding surface having a pre-determined curvature to form a first surface of the resulting contact lens;
- a flexible female mold portion comprising a hollow cylindrical portion having a principal longitudinal axis and having an open upper end and a closed lower end, the internal diameter of said female cylindrical portion when adjusted being sufficiently greater than the external diameter of said male support portion to permit frictionless insertion of the male portion thereto;
- said female portion being circumferentially closed at the lower end thereof by a second molding surface having an adjustable curvature to form a second surface of the resulting contact lens;
- adjustment means operatively associated and in contact with said female mold portion at about the horizontal plane of said second surface for flexing said female mold portion and said second surface into the desired configuration and retaining that configuration during casting; and
- an integral rim portion flexible inwardly towards the axis of both said molding surfaces attached circumferentially to, and integral with, one of said molding surfaces and having an axis common with the principal longitudinal axis of the mold portion;
- whereby said flexible rim allows for relative movement between said male portion and said female portion when said portions are in contact with each other, said rim, inwardly flexible towards the axis of said molding surfaces.

34. A mold assembly for casting a contact lens having at least one toric surface, said mold assembly including:
- a flexible male mold portion including a substantially cylindrical support portion having a principal longitudinal axis and a first molding surface attached circumferentially to said cylindrical support portion, said molding surface having a pre-determined curvature to form a first surface of the resulting contact lens;
- a female mold portion comprising a hollow cylindrical portion having a principal longitudinal axis and having an upper end and a closed lower end, the internal diameter of said female cylindrical portion when adjusted being sufficiently greater than the external diameter of said male support portion to permit frictionless insertion of the male portion thereto;
- said female portion being circumferentially closed at the lower end thereof by a second molding surface having an adjustjable curvature to form a second surface of the resulting contact lens;
- adjustment means operatively associated and in contact with said flexible male mold portion at about the horizontal plane of said first surface for flexing said male mold portion and said first surface into the desired configuration and retaining that configuration during casting; and
- an integral rim portion flexible inwardly towards the axis of both said surfaces attached circumferentially to, and integral with, one of said molding surfaces and having an axis common with the principal longitudinal axis of the mold portion;
- whereby said flexible rim allows for relative movement between said male portion and said female portion when said portions are in contact with each other, said rim, inwardly flexible towards the axis of said molding surfaces.

35. A contact lens mold comprising:
- a male portion including a substantially cylindrical support portion and a first molding surface having a principal longitudinal axis, sid molding surface having a predetermined curvature to form a first surface of said desired contact lens;
- a flexible female mold portion including a second molding surface having a principal longitudinal axis, said molding surface having a predetermined curvature to form a second surface of said desired contact lens, said female portion, comprising a hollow cylindrical portion having an open upper end and a closed lower end;
- at least one of said male mold portion and said female mold portion being flexible; and
- a rigid cylindrical ring torsioning means removably attached to said female mold portion, said ring provided with a pair of adjustable set screws which engage said female mold portion adjacent said second molding surface.

* * * * *